United States Patent Office 2,830,018
Patented Apr. 8, 1958

2,830,018
SECONDARY RECOVERY OF OIL

William E. Thompson, Wallingford, and Francis A. Boyle, Norwood, Pa., assignors to Sun Oil Company, Philadelphia, Pa., a corporation of New Jersey No Drawing. Application December 16, 1955
Serial No. 553,425

4 Claims. (Cl. 252—8.5)

This invention relates to the secondary recovery of petroleum by the water flooding method and more particularly is concerned with the treatment of water input wells for the purpose of facilitating the injection of flood water into an oil reservoir.

The water flooding of underground oil-bearing formations has been widely used for increasing the recovery of oil from the formation. This procedure involves the injection of water or brine into input wells to force oil through the surrounding formation toward output wells from which it can be recovered. The success of the water flooding operation manifestly depends upon its total cost being less than the value of the additional oil recovered from the reservoir.

A substantial factor in the economics of water flooding is the cost of pumping the water into the formation. In many cases pumping costs may be too high to permit this secondary recovery method to be employed successfully. This is occasioned by unduly low rates of water injectivity into the formation for a given pump pressure, which necessitates the use of excessively high pressures to force the water into the formation at the desired rate. When this condition prevails, a conventional flooding operation cannot be practiced economically.

The present invention is directed to a method of treating an input well so that the water injectivity rate can be substantially increased for a given pump pressure level. According to the invention, the formation adjacent the input well is treated by means of a water-miscible solution of an organic treating agent which has the ability to increase the permeability of an oil-bearing formation to water or brine. The organic treating agent can be either a cyanide or an isocyanide having 1-30 carbon atoms per molecule. We have found that when such compounds are used to treat the formation surrounding the well bore, a substantial increase in the permeability of the treated zone toward water or salt is effected. Since the main resistance to water flow is offered by the zone immediately adjacent the well, the treatment of this zone in accordance with the invention permits a substantial increase in the pumping rate at a given pressure or a substantial reduction in the required pump pressure for a given rate of injection.

As stated above, the compounds which are useful for practicing the invention are organic cyanides and isocyanides having 1-30 carbon atoms per molecule. These compounds are employed in minor amounts in solution with a suitable hydrophilic solvent. The low molecular weight compounds which have substantial water solubility, such as acetonitrile, propionitrile, butyronitrile, methyl isocyanide and ethyl isocyanide, may be used satisfactorily in water solution. Higher molecular weight compounds which do not have appreciable water solubility should be dissolved in a solvent which is miscible with water, such as alcohol or acetone, or a mixture of such organic solvent with water. The percentage of treating agent in solution may vary considerably but generally should be relatively small, for example, in the range of 0.05–4.0% by volume. Preferred concentrations for the cyanide or isocyanide compounds generally lie within a lower part of the foregoing range, such as 0.10–0.50%.

The cyanide and isocyanide treating agents which are useful for practicing the invention include both saturated and unsaturated aliphatic compounds. Examples are acetonitrile, isopropyl cyanide, amyl cyanide, octyl cyanide, decyl cyanide, the nitriles derived from higher molecular weight fatty acids such as lauric, myristic, palmitic and stearic acids, and the isocyanides corresponding to the foregoing compounds. Useful treating agents also include aromatic cyanides and isocyanides, such as benzonitrile, phenylacetonitrile, tolunitrile and the like. They also include compounds containing cycloaliphatic groups, such as the nitriles and isonitriles derived from petroleum naphthenic acids which may range up to 30 carbon atoms per molecule. Nitriles and isonitriles prepared from resin acids also may be used.

In treating a well according to the invention, a suitable aqueous or organic solvent solution of the treating agent is prepared for introduction into the formation. It is desirable to employ a water soluble compound, such as a low molecular weight nitrile, so as to avoid the use of an expensive organic solvent; however, higher molecular weight compounds in aqueous alcohol solution can be employed without incurring costs that are prohibitive. The solution is pumped down the well and through the wall of the borehole into the oil-bearing formation. The amount of solution introduced into the formation generally should be sufficient to treat a zone extending several feet from the borehole, for example, a zone of 3 to 10 feet radius; and in any event the amount so introduced should be enough to cause the injection rate to increase for a given pump pressure. After introducing the treating agent, the flood water is then pumped through the well into the formation in the usual manner but at a rate higher than would be obtainable if the formation had not been treated.

It is not known with certainty why treatment with the types of compounds above-described will increase the permeability of an oil-bearing formation to water. Similar treatments done with numerous other types of organic compounds have been found to produce just the opposite effect, namely, to decrease the permeability with respect to water. It is believed, however, that the cyanide and isocyanide compounds in some manner help to move the droplets of residual oil that otherwise would not flow through the formation. By flowing this residual oil away from that portion of the formation adjacent the borehole, the resistance to water flow is considerably reduced and the injection of water is correspondingly facilitated. Once the removal of residual oil from the immediate vicinity of the borehole is accomplished, the resistance to flow of the water will remain low throughout the course of the flooding operation. The treatment thus achieves a permanent improvement in the pumping operation.

The following example is a specific illustration of the use of the invention:

An oil bearing formation located at a depth in the vicinity of 8700 feet and having a thickness of 31 feet is subjected to a water flooding operation. The formation has an average porosity of 26.5% and an average permeability to water of about 413 millidarcys, and core studies show that its residual oil content is 20.5%. Prior to treatment the rate of pumping of water into an input well is about 155 bbls. per day. The formation is then treated by pumping therein a solution of decyl nitrile comprising 7 gals. of this compound dissolved in 40 bbls. of 60% aqueous methanol. The flood water is then pumped into the formation again at the same pump pressure, with the result that its injection rate is approximately double that obtained prior to treatment.

We claim:

1. In the secondary recovery of petroleum from an underground formation by the water flooding method, the step of increasing the injectivity of flood water into an input well which comprises introducing through the well into the adjacent formation a water-miscible solution of an organic treating agent having 1–30 carbon atoms and selected from the group consisting of cyanides and isocyanides.

2. Method according to claim 1 wherein there is introduced into the well a $C_1$–$C_3$ nitrile in aqueous solution.

3. Method according to claim 1 wherein there is introduced into the well a water-insoluble aliphatic nitrile in a water-miscible solvent.

4. Method according to claim 3 wherein the nitrile is decylnitrile.

References Cited in the file of this patent

UNITED STATES PATENTS

| 2,204,223 | Lawton et al. | June 11, 1940 |
| 2,356,205 | Blair et al. | Aug. 22, 1944 |
| 2,465,237 | Larsen | Mar. 22, 1949 |

OTHER REFERENCES

Kinney et al.: "Wettability," World Oil, vol. 132, No. 4, March 1951, pages 145, 146, 148, 150 and 154.